Aug. 30, 1960     K. GEBELE     2,950,666
COUPLING MECHANISM FOR EXPOSURE SETTING MEMBERS OF CAMERAS
Filed Feb. 7, 1958     3 Sheets-Sheet 1
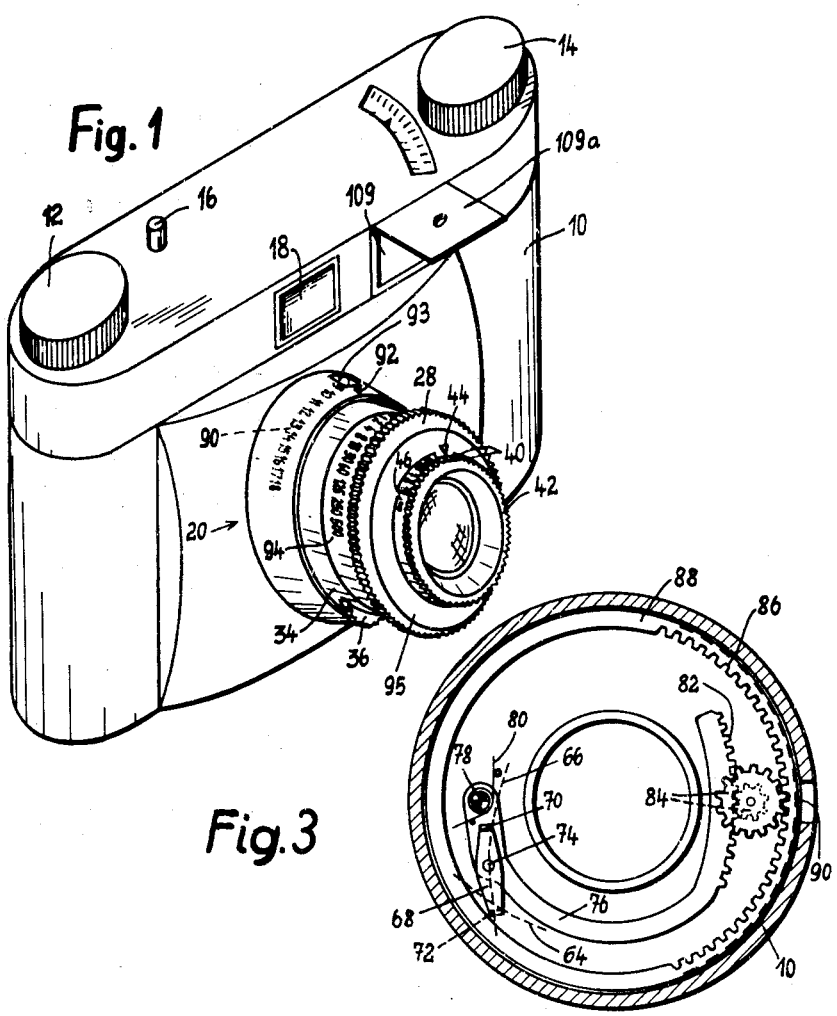

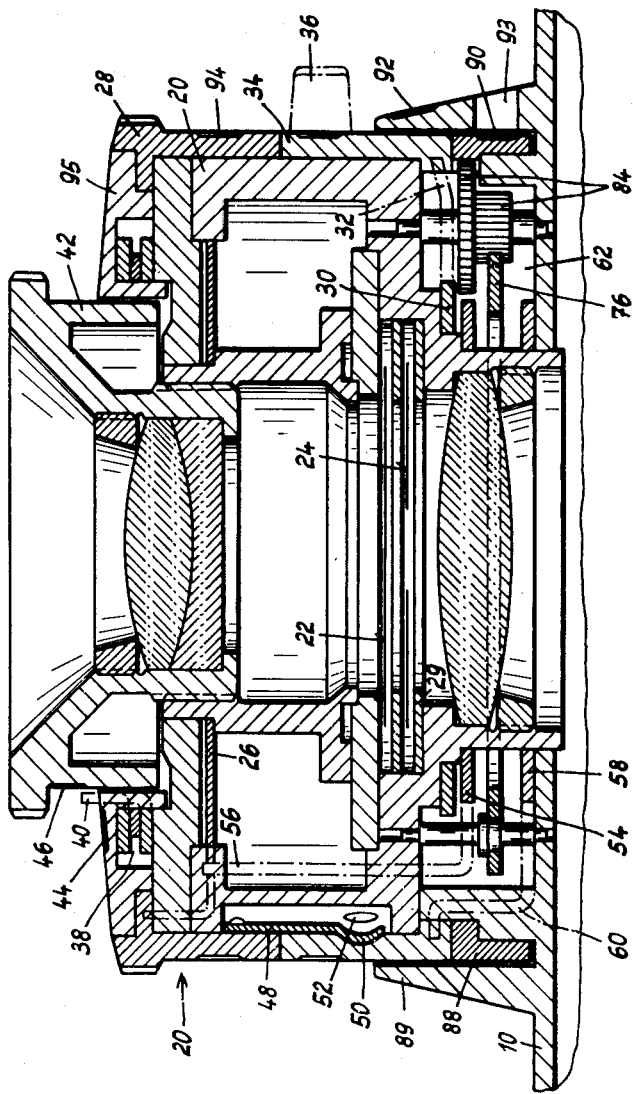

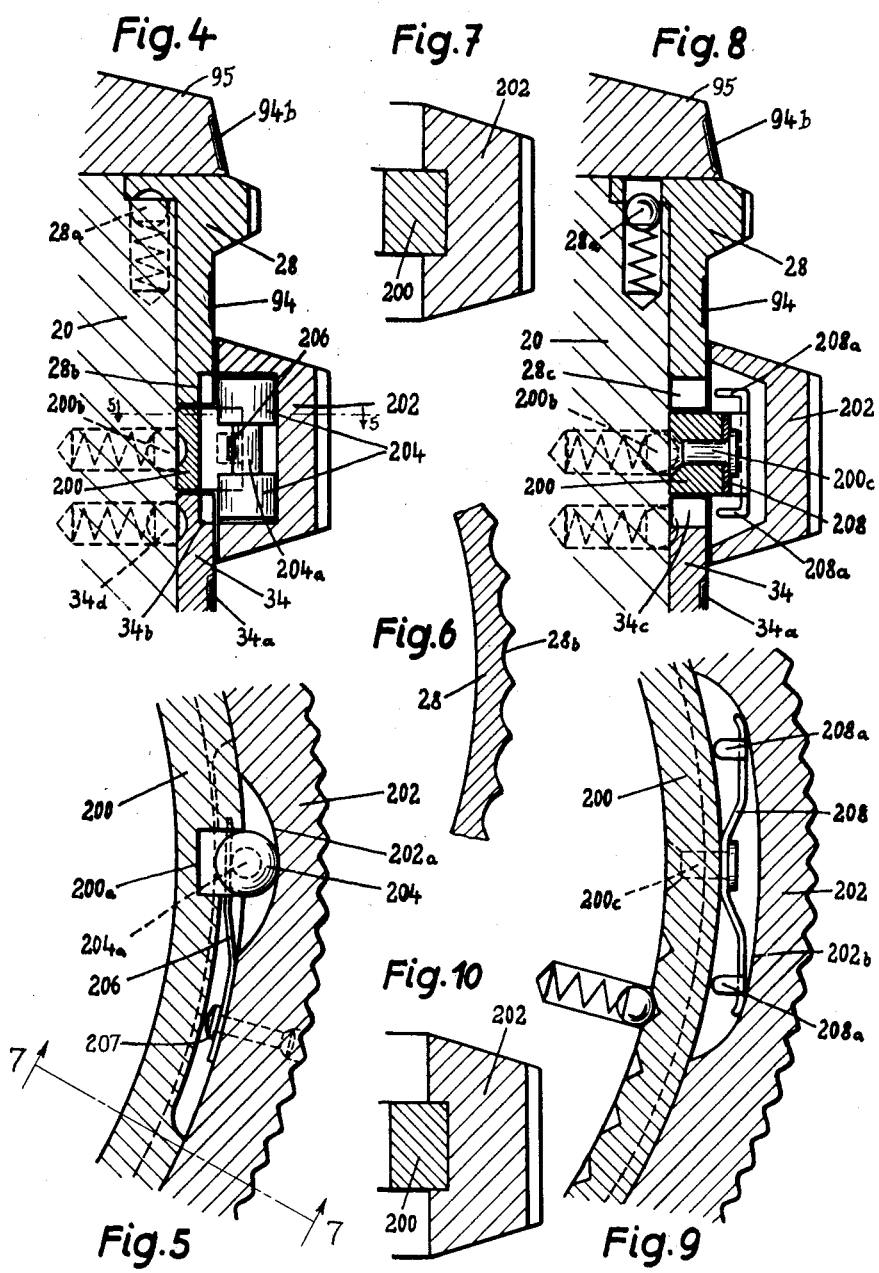

United States Patent Office 2,950,666
Patented Aug. 30, 1960

2,950,666

COUPLING MECHANISM FOR EXPOSURE SETTING MEMBERS OF CAMERAS

Kurt Gebele, Munich, Germany, assignor to Compur-Werk Friedrich Deckel OHG, Munich, Germany, a German firm Filed Feb. 7, 1958, Ser. No. 713,826

Claims priority, application Germany Feb. 9, 1957

6 Claims. (Cl. 95—64)

This invention relates to photographic cameras, and particularly to the coupling means or mechanism for coupling two setting members to each other so that they may be moved jointly during the setting operation, such setting members preferably being the shutter speed setting member and the diaphragm aperture setting member.

An object of the invention is the provision of generally improved and more satisfactory coupling mechanism for use with the exposure setting members of photographic cameras.

Another object is the provision of coupling mechanism which is normally uncoupled from both of the members to be actuated thereby (e.g., a shutter speed setting member and a diaphragm aperture setting member) and which serves automatically to couple both setting members to an actuating member when the actuating member is moved.

A further object is the provision of mechanism applicable to two coaxially rotatable setting members of a photographic camera, so designed that either setting member may be freely turned by itself, without being impeded by a common actuating member, and that both of the setting members may be simultaneously turned to the same extent when a common actuating member is turned.

These and other desirable objects may be attained in the manner disclosed as an illustrative embodiment of the invention in the following description and in the accompanying drawings forming a part hereof, in which:

Fig. 1 is a perspective view of a camera of the type to which the present invention may be applied, in order to enable a better understanding of the background or environment of the invention;

Fig. 2 is a longitudinal or axial diametrical section through the shutter assembly or optical unit shown in Fig. 1, and a fragment of the camera body;

Fig. 3 is a transverse diametrical section through the exposure value indicating mechanism shown in Fig. 1;

Fig. 4 is a fragmentary longitudinal radial section through a portion of the shutter assembly or optical unit, illustrating a first embodiment of the present invention;

Fig. 5 is a transverse radial section taken approximately on the line 5—5 of Fig. 4;

Fig. 6 is a transverse radial section through a portion of the construction shown in Fig. 4;

Fig. 7 is a longitudinal radial section taken approximately on the line 7—7 of Fig. 5;

Fig. 8 is a view similar to Fig. 4 showing a second embodiment of the invention;

Fig. 9 is a view similar to Fig. 5, illustrating the second embodiment; and

Fig. 10 is a view similar to Fig. 7, again illustrating the second embodiment.

The same reference numerals throughout the several views indicate the same parts.

Figs. 1–3 of the present drawings illustrate a typical form of camera and associated shutter assembly or optical unit, with which the present invention is useful. The camera body is indicated in general at 10. Except as otherwise disclosed it may be any conventional camera of a compact or "miniature" type adapted, for example, to make exposures on 35 millimeter film. The camera has a conventional film winding knob 12, and a rewinding knob 14 for winding the film back into a cassette or cartridge when all of the exposures have been made. As usual, the feeding of the film by operation of the knob 12 serves also to set or cock or tension an objective shutter mounted on the camera, ready for the next exposure. The exposure is made by depressing the shutter release plunger 16 mounted on the camera body and operatively connected to the shutter in any conventional manner. The camera may have a direct vision view finder 18, and may be equipped with a photoelectric exposure meter built into the camera body as shown at 109, the meter having a flap 109a with a small aperture therein, so that when it is desired to operate the meter at maximum sensitivity (in relatively dim light) the flap 109a may be held in its open position as shown in Fig. 1, whereas under brilliant illumination conditions the meter may be operated in a lower sensitivity range by closing the flap 109a so that the photoelectric cell receives only such light as enters through the small aperture in the flap.

Mounted at the front of the camera body is an objective shutter assembly or optical unit, which may be either permanently mounted on the camera or detachable therefrom in an interchangeable manner (e.g., by bayonet connection lugs or the like) since the present invention does not depend in any way upon whether the shutter assembly is permanently mounted or interchangeably mounted, and the invention is, in fact, independent of most of the details of construction of the shutter assembly or optical unit. Such details thereof as are here given, are disclosed merely to acquaint the reader with the general background or environment in which the present invention is useful. Certain details of the shutter assembly will therefore be described below, rather briefly, merely as typical examples of the environment of the invention, and not in a limiting sense. Even these briefly described details may be disregarded by those who are already familar with objective shutters of the exposure value setting type in which a shutter speed setting member and a diaphragm aperture setting member both rotate coaxially about the optical axis of the shutter as a center, and are in complementary relation to each other. Those who are thoroughly familiar with such shutters will at once be able to understand the present invention by reference to the subsequent description of the structure shown in Figs. 4–10 of the present drawings, and can advantageously skip the intervening description of the structure shown in Figs. 1–3.

In Figs. 1 and 2, the shutter assembly or optical unit is indicated in general at 20, and has shutter blades 22 of any desired number, movable between a closed position obstructing passage of light along the optical axis which extends centrally through the shutter, to an open position permitting passage of light along the optical axis. The shutter carries the usual picture taking lens, preferably consisting of two or more elements or components as indicated diagrammatically in Fig. 2, one or more of which components may be movable axially for focusing. The shutter also includes the usual iris diaphragm, the adjustable leaves of which are indicated at 24. Except for parts particularly mentioned below, the shutter may be of conventional known construction, the details of which are not important for present purposes.

In the annular space within the shutter housing indicated in general at 20, there is mechanism of any known form for opening and closing the shutter blades 22 to make an exposure, the movement being at a controlled speed which is adjustable so as to be able to make exposures at different times or durations. The speed or duration of exposure is controlled or set by a control ring 26 rotatable within the shutter housing near the front thereof, and having one or more control cams for controlling the retarding mechanism of the shutter so as to determine the duration of exposure. Except for parts specifically described herein, the shutter may be constructed in a general way in the manner disclosed in Deckel and Geiger Patent 1,687,123, granted October 9, 1928, and the control ring 26 of the present construction may correspond essentially to the shutter speed control ring or cam ring 63 in said Deckel and Geiger patent. The internal construction of the shutter is not necessarily in the form shown in this patent, however, as it may take many different forms. For example, except for features otherwise described herein, the shutter may be in any of the forms disclosed in the copending U.S. patent applications of Kurt Gebele, Serial No. 509,929, filed May 20, 1955, or Serial No. 514,218, filed June 9, 1955, issued on August 25, 1959, as Patent 2,900,885, or Serial No. 520,875, filed July 8, 1955, issued on August 25, 1959, as Patent 2,900,886.

The shutter speed control ring or cam ring 26 is operatively connected to an external and manually accessible speed setting ring 28 which rotates around the outside of the shutter housing near the forward end thereof. The connection between the members 26 and 28 may take any desired mechanical form; for example, an arm on the ring 26 which extends radially outwardly and then forwardly to engage in a recess or notch formed in an inwardly extending flange of the ring 28, as seen near the left hand side of Fig. 2. If desired, detent means may be provided for engaging the member 28 to tend to hold the members 26 and 28 in any adjusted position in which they may be set at the moment, until the ring 28 is turned with sufficient force to overcome the resistance offered by such detent means. This detent means may take, for example, the form of a spring loaded or spring pressed ball mounted in a stationary part and pressed into a circumferentially extending series of notches or depressions in the member 28, so that as the ring 28 is rotated about the optical axis as a center, successive depressions will be brought opposite the spring pressed ball. Such a spring pressed ball is shown at 28a in Figs. 4 and 8.

The diaphragm leaves 24 can be set to different diaphragm openings or apertures by turning a rotatable diaphragm control ring 29 which, like the shutter speed control ring 26, is rotatably mounted within the shutter. This internal diaphragm adjusting ring 29 is operatively connected to another ring 30 rotatable on a shoulder on the rear of the main shutter housing, which ring 30 in turn is connected by a radial arm 32 to the outer or external diaphragm setting ring 34 which rotates on the outside of the shutter housing, rearwardly of the external shutter speed setting ring 28. Preferably the shutter speed setting ring 28 is provided with a circumferentially extending rib which is milled or serrated for easy manual grasping to turn the ring, but the aperture setting ring 34 may have a smooth exterior except for a finger piece 36 which may be grasped to turn it.

At some suitable point in the shutter unit, for example in the annular space 38 near the front of the unit, there is arranged a depth of field indicating device having two movable pointers 40 which sweep over the focusing distance scale 46 which extends circumferentially on the periphery of the rotatable focusing lens mount 42 which carries the front lens component. The depth of field indicating pointers 40 move symmetrically on opposite sides of the fixed index mark 44 which is marked on a stationary front part of the shutter housing and which is used for reading the distance to which the focusing scale 46 is set. The pointers 40 are driven from a forwardly extending arm on one or another of the diaphragm aperture adjusting rings, through intermediate driving mechanism of any suitable known form, e.g., the form of depth of field indicator driving means or transmission means disclosed in the copending U.S. patent applications of Franz Singer, Serial No. 555,964, filed December 18, 1955 (now Patent 2,926,588, granted March 1, 1960), or Kurt Gebele, Serial No. 562,346, filed January 30, 1956, or Franz Singer, Serial No. 562,872, filed February 1, 1956 (now abandoned).

A construction of the same general character shown in Figs. 1–3 of the present drawings is disclosed in somewhat greater detail in the copending patent application of Kurt Gebele, Serial No. 710,212, filed January 21, 1958. In the construction as disclosed in the copending application just mentioned, there is a resilient coupling tongue 48 riveted at its forward end to the inner face of the ring 28, and having a rear end 50 which is resiliently pressed outwardly in a radial direction, into one or another of the notches 52 formed on the inner face of the diaphragm aperture setting ring 34, so that the tongue serves to couple the rings 28 and 34 to each other to tend to turn both rings when one of them is turned. According to the present invention, however, this tongue 48 and the notches 52 are preferably omitted. The present invention may be regarded as an improvement upon the construction disclosed in the copending application just mentioned.

The internal mechanism of the shutter speed control and the diaphragm aperture control is so designed and proportioned that when the speed control ring 28 and the aperture control ring 34 are both turned in the same direction through the same angular amount, the change in diaphragm aperture compensates for the change in shutter speed, and vice versa, without any change in the exposure value or what may be termed the "total exposure value" determined by the relationship of shutter speed to diaphragm aperture. This is fully explained in the copending U.S. patent application of Kurt Gebele, Serial No. 389,775, filed November 2, 1953 (now Patent 2,829,574, granted April 8, 1958), to which reference may be made for a more complete understanding of the matter of total exposure value and the matter of complementary movement of shutter speed adjusting means and diaphragm aperture adjusting means so that the change in one compensates for the change in the other.

In the rear part of the shutter unit there is a cam ring 54 rotatable about the optical axis and coupled by means of an arm 56 to the shutter speed setting ring 26, so as to turn therewith. Another cam ring 58, rearwardly of the cam ring 54, is also rotatable about the optical axis, and is coupled by means of an arm 60 to the diaphragm aperture setting ring 34, so that both of these rings rotate together as a unit. The ring 54 has a peripheral cam surface 64, and the ring 58 has a peripheral cam surface 66, both shown in dotted lines in Fig. 3, which cam surfaces cooperate respectively with the two ends 70 and 72 of a double armed lever 68 pivotally mounted at its mid point 74 on a swinging arm 76 pivotally supported on a suitable fixed part 78 of the camera body or the shutter assembly. Under the influence of a spring 80, the arm 76 constantly tends to turn in a counterclockwise direction when viewed as in Fig. 3, thereby keeping the ends of the cam follower lever 68 against the respective cam surfaces 64 and 66.

The free end of the arm 76, remote from the pivot 78, is formed into a gear segment 82 concentric with the pivot 78. This gear segment meshes with the smaller diameter gear teeth of a compound or double pinion 84 mounted to turn on a fixed pivot in the camera body or the rear part of the shutter assembly. The larger diameter teeth of the compound pinion 84 mesh with internal gear teeth 86 on an annular ring 88 which rotates concentrically with the optical axis in an annular groove formed in a stationary housing part 89 which projects forwardly from the front wall of the camera body as seen in Fig. 2. On its periphery, the ring 89 carries the graduated scale 90 which is graduated preferably numerically in terms of exposure value. The scale is read by means of an index mark or reference point 92 (Fig. 1) marked on the housing portion 89 preferably on the part thereof which is at the top when the camera is held in normal picture taking position as in Fig. 1. A window 93 in the portion 89 of the structure, adjacent the reference mark 92, permits the appropriate graduation of the scale 90 to be seen.

The cam portions 64 and 66 are so designed that their collective action on the ends of the lever 68 serves to position this lever in a manner to swing the lever 76 to turn the exposure value scale ring 88 to the appropriate point so that the exposure value on the scale 90 is visible through the window 93 opposite the reference point 92. If both rings 28 and 34 move through equal angles in the same direction, this will result in no change of exposure value, nor will the position of the exposure value scale ring 88 be changed. During such joint turning of the rings 28 and 34, one of the cams 64 and 66 will have its rise increased while the other cam will have its rise decreased, to a corresponding extent, thereby causing no swinging of the arm 76 and no rotation of the ring 88. But if one of the rings 28 and 34 is turned without turning the other, then one of the cams 64 and 66 will turn without turning the other, and this will cause a motion of the pivot 74 of the cam follower lever 68, thereby swinging the arm 76 to move the exposure value scale ring 88 so as to make the newly set exposure value visible through the window 93. This is more fully explained in the above mentioned copending application, Serial No. 710,212.

As already indicated above, the present invention may be used in the general environment described in connection with Figs. 1–3, but these views do not themselves illustrate the present invention. Referring now to Figs. 4–7, which show a construction in accordance with a first embodiment of the present invention, the shutter speed setting ring is shown at 28, and the diaphragm aperture setting ring at 34, both rings rotating on the outside of the shutter assembly housing, coaxially with the optical axis, as previously described. The shutter speed scale or exposure time scale 94 marked on the periphery of the ring 28 may be read in conjunction with a fixed reference point 94b marked on a stationary front member 95 at the front of the housing. If it is desired to provide a diaphragm aperture scale, this may be marked circumferentially on the ring 34, as shown at 34a. However, if the shutter unit is provided with a depth of field indicator as illustrated at 40 in Fig. 1, then a diaphragm aperture scale is unnecessary (provided, of course, that a total exposure value scale is used) because all useful information which the photographer can obtain by referring to a diaphragm aperture scale, can be secured in even more useful form from the exposure value scale and the depth of field indicator.

According to the present invention, the rings 28 and 34 are slightly spaced axially from each other. In the space between these two rings, there is a ring 200 rotatable on the periphery of the shutter housing or casing, about the optical axis as a center, this ring 200 therefore rotating concentrically or coaxially with the rings 28 and 34. Still another ring 202 is carried by the ring 200 and has a limited degree of rotation relative to the ring 200, coaxially with the latter. The ring 200 may be conveniently called a carrier ring, since it carries the below-described coupling member around with it, and the ring 202 may be conveniently called an actuating ring, since it is grasped and turned by the fingers of the operator when using the device.

In the ring 200 is a notch 200a, into which is received a portion of a double roller 204, the axis of which extends parallel to the optical axis. This double roller 204 is necked down in its central portion 204a, and the necked down portion is engaged or loaded by a leaf spring 206 which is held fast to the outer ring 202, as for example by means of a rivet 207. This leaf spring tends to press the roller 204 radially outwardly (relative to the optical axis) to hold it against the face of a recess 202a formed in the inner face of the ring 202. This recess 202a is tapered or inclined in both directions circumferentially from the roller 204, as well seen in Fig. 5. The roller is freely movable within the notch 200a, the motion of the roller in a direction approximately radially relative to the optical axis being limited only by the bottoms of the notch 200a and the recess 202a. In areas to either side of the recess 202a, the ring 202 partially encompasses the front and rear edges of the ring 200 in the manner shown in Fig. 7, to hold the ring 202 against axial movement while allowing limited rotation of the ring 202 relative to the ring 200.

Although only notch 200a, one notch 202a, and one roller 204 are shown in Fig. 5, the construction preferably includes a series of such notches and rollers, spaced symmetrically at various circumferential intervals of the rings 200 and 202, so that there will be symmetrical loading and symmetrical coupling engagement at various points around the periphery of the shutter assembly.

On the outer peripheries of the respective rings 28 and 34, in positions which lie opposite the ends of the rollers 204, as seen in Fig. 4, there are circumferentially spaced notches 28b and 34b, respectively. These notches are preferably relatively small and closely spaced in a circumferential direction, with at least two of such notches within each circumferential space or angular increment corresponding to one graduation of the shutter speed scale 94 and one graduation of the diaphragm aperture scale 34a, if such a scale is provided.

It has already been mentioned that a spring-pressed ball 28a is preferably provided to hold the ring 28 resiliently in any desired position in which it is set. Preferably a similar spring-pressed ball 34d engages a series of notches on the inner face of the ring 34, to tend to hold this ring also in any position in which it may be set. But either one of the rings 28 and 34 may be turned to a new position by applying sufficient force to overcome resistance offered by its respective spring detent 28a or 34d.

This coupling arrangement operates as follows: When the exposure value is set, either one of the rings 28 and 34 may be turned (the latter by means of the finger piece 36) while leaving the other stationary, in order to change the relative orientation of these two rings, thereby changing the exposure value. The exposure value resulting from this change of orientation may be read from the scale 90, through the window 93, or if desired the cam follower 68 may be operatively connected to a follow-up pointer of an exposure meter or to any other suitable movable pointer on the camera body, as more fully explained in said copending patent application, Serial No. 710,212. Whatever means be employed for determining the correct exposure value setting, and whichever one of the two rings 28 and 34 be turned to arrive at such setting, it is apparent that either of these rings may be turned freely without any drag caused by the other of such rings.

However, upon completion of the setting of the exposure value, it may then be desirable to turn both of the rings 28 and 34 simultaneously, in order to select a more desirable pair of values (shutter speed and diaphragm aperture) than the pair of values which happens to be set at the completion of the exposure value setting operation. To reset the shutter so as to select any other desired pair of coordinate or complementary values of shutter speed and diaphragm aperture, without changing the exposure value setting, the operator grasps and turns the ring 202. The turning of the ring 202 in either direction causes it to turn slightly relative to the ring 200, which tends to lag behind, either because of its inherent friction on the stationary housing parts, or because of special frictional means or detent means which may be provided if desired. Frequently the inherent friction of the ring 200 will be sufficient, but if it proves to be insufficient, a frictional detent 200b may be provided, in the form of a spring-pressed ball seating in a series of notches in the inner face of the ring 200. In any event, the turning of the ring 202 relative to the ring 200 which tends to lag behind, causes the inclined or tapered portion at the trailing end of the notch 202a to force the roller 204 radially inwardly toward the optical axis, against the light outward force of the spring 206, so that the ends of the roller 204 are forced radially into the notches 28b and 34b of the respective rings 28 and 34. This serves to couple the rings 28 and 34 to the ring 202, so that the rotation of the ring 202 is accompanied by simultaneous rotation of both rings 28 and 34, and of course the ring 200 also turns with them, due to the fact that the roller 204 is in the notch 200a of the ring 200. The most favorable pair of values (of shutter speed and diaphragm aperture) can thus be selected very easily and quickly by turning the ring 202, without changing the relative positions of the rings 28 and 34 with respect to each other, and therefore without changing the exposure value for which the shutter mechanism is set.

As soon as the operator releases the ring 202, the spring 206 again displaces the roller 204 radially outwardly and thus uncouples the rings 200 and 202 from the rings 28 and 34, which now are able once more to turn independently, if a new setting of exposure value is desired. The outward motion of the roller 204 under the influence of the spring 206 (upon release of the ring 202) will be accompanied, of course, by a slight turning of the ring 202 is a circumferential direction, until the bottom or lowest point of the cam notch 202a comes opposite the roller.

The advantages of this coupling arrangement will now be clearly evident. First of all, the invention provides a coupling by which the two setting members (28 and 34) become coupled to each other only after a special member (the adjusting or actuating ring 202) has been grasped and displaced. When this actuating member is released, the coupling is automatically disconnected, so that during the rest of the setting process, the individual setting members can move freely whenever sufficient force is applied to overcome the inherent frictional resistance of the member to be turned and the added resistance of the resilient or displaceable detent means, if any such means is provided.

The arrangement also has the advantage that when setting the exposure value, only one member need be grasped and turned (normally the member 34 or a knob or actuator operatively connected to it) and whenever changing the pairs of coordinate values without changing the exposure value, it is also necessary to grasp only a single member, namely the member 202. Because the members 28 and 34 are normally not coupled to each other, little or no frictional detent means is necessary in order to hold one of these members in stationary position when the other is to be turned alone. The present invention therefore enables the setting to be accomplished with only slight expenditure of force, and very rapidly. Moreover, a dependable coupling is obtained as soon as the operator grasps and turns the special member intended for this purpose, and this coupling is secured in any position (for practical purposes) of the setting members 28 and 34, since the respective notches 28b and 34b are relatively fine and are closely spaced, as already mentioned.

Another advantage of this coupling means is that the coupling arrangement can be completely covered and closed off from the outside, so that deposit of dirt or damage to the coupling parts is avoided. At the same time, the covered arrangement of the coupling makes it possible to give the shutter a neat, attractive, and streamlined appearance. Finally, it may be mentioned that the coupling parts can be easily and economically manufactured, and take up extremely little space, so that they can be arranged practically in any construction of a shutter unit and therefore can be provided even in miniature or very small cameras without difficulty.

Another embodiment of the present invention is illustrated in Figs. 8–10 of the present drawings. In principle, this second embodiment operates in the same way as the first one, and it is believed that the construction will be largely obvious from the drawings alone, in view of what has already been said about the first embodiment. The construction is quite similar in general, but instead of coupling being accomplished by rollers, it is accomplished in this second embodiment by leaf springs 208, each of which is fastened at its middle to the inner ring 200 by means of a rivet 200c. Each spring has two arms, extending in opposite directions circumferentially of the ring 200 from the rivet 200c, and lying within the arcuate recess 202b of the external ring 202. Each arm of the spring 208 carries a pair of ears 208a which extend radially inwardly toward the optical axis, to act as clamping jaws to engage in the notches 28c and 34c of the respective rings 28 and 34.

When the ring 202 is grasped and turned in either direction, the trailing edge of the arcuate recess 202b serves to cam inwardly the corresponding end of the leaf spring 208, forcing the jaws 208a thereof into the notches 28c and 34c of both rings 28 and 34, thus accomplishing coupling just as in the case of the rollers.

The coupling means of the present invention has been described above in the specific example of coupling a shutter speed adjusting ring to a diaphragm aperture adjusting ring. However, these particular rings have been mentioned only by way of example, for it will now be clear to those skilled in this field that this same coupling mechanism may be used for coupling any two coaxially rotatable adjusting rings or setting rings of a photographic shutter assembly. It has already been shown in applicant's copending patent application, Serial No. 562,333, filed January 30, 1956 (now Patent 2,917,983, granted December 22, 1959), that under certain conditions it is desirable to couple a diaphragm aperture adjusting member to a focus adjusting member. The coupling means of the present invention may be employed equally well for this purpose, since the rings 28 and 34 as shown in Figs. 4–10 of the present drawings could just as well represent focus adjusting and aperture adjusting rings, rather than shutter speed adjusting and aperture adjusting rings.

Coupling notches 28b, 28c, 34b, and 34c are preferably provided, as shown, to insure a coupling action which is positive. But under some conditions it may be desirable to omit these coupling notches, and to rely merely upon frictional contact between the roller 204 or the spring ears 208a and the rings to be coupled thereto, instead of using the notches.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. Adjusting means for a photographic unit having an optical axis, comprising a shutter speed adjusting ring rotatable about said optical axis, and a diaphragm aperture adjusting ring also rotatable about said optical axis, characterized by the provision of a carrier ring also rotatable about said optical axis in a position adjacent both of said adjusting rings, a coupling member moving bodily with said carrier ring when the latter is rotated, said coupling member having limited movement in a direction approximately radially relative to said optical axis into and out of coupling contact with said adjusting rings, an actuating ring also rotatable about said optical axis, said actuating ring being slidably mounted on said carrier ring for rotation relative thereto, and means defining a notch in said actuating ring for receiving a portion of said coupling member and having a cam surface extending in a circumferential direction for engaging said coupling member and camming it approximately radially into engagement with said adjusting rings upon turning said actuating ring relative to said carrier ring.

2. A photographic objective unit having a first adjusting ring and a second adjusting ring both accessible for manual rotation and rotatable about a common optical axis of rotation normally independently of each other when either ring is separately grasped and turned, for separate and independent adjustment of two separate photographic factors, characterized by the provision of actuating means for simultaneously rotating both of said adjusting rings to adjust both of said factors simultaneously when desired, said actuating means comprising a third ring also rotatable about said axis, part of said first ring and part of said second ring being spaced from each other in the direction of said optical axis, said third ring lying between said spaced parts of said first and second rings, a coupling member engaged by said third ring to turn bodily therewith upon rotation of said third ring about said optical axis, said coupling member being mounted for limited movement in an approximately radial direction with respect to said axis, into and out of driving engagement with both of said first two rings, and an actuating ring also rotatable about said optical axis, said actuating ring being carried by said third ring for rotation relative thereto, said actuating ring having a cam surface inclined in a direction circumferentially of said actuating ring and engaging said coupling member to cam said coupling member approximately radially into driving contact with both of said first two rings by the act of turning said actuating ring relative to said third ring.

3. A construction as defined in claim 2, further including resilient means tending to displace said coupling member approximately radially away from said first two rings to tend to hold it in non-driving relation thereto.

4. A construction as defined in claim 2, in which each of said first two rings has a circumferentially extending series of depressions for driving engagement with said coupling member.

5. A construction as defined in claim 2, in which said actuating ring is an external and manually accessible ring encircling said third ring and enclosing said coupling member to protect the same against access of external dirt.

6. Coupling means for adjusting members of a photographic unit of the type having an optical axis and including a housing having a fixed mounting part, comprising a shutter speed setting member and a diaphragm aperture setting member both rotatably mounted on the fixed housing part for rotation relative to each other, a carrier member also rotatably mounted on the fixed part for rotation relative to said setting members, a coupling member movable with said carrier member and also movable radially through a limited range relative to said carrier member, into and out of coupling engagement with both of said setting members, an actuating member carried by said carrier member and rotatable relative to the fixed housing part and to said carrier member, and means including a cam surface on said actuating member for automatically moving said coupling member into coupling engagement with both of said setting members and thereafter moving said coupling member and the coupled setting members along with said actuating member, upon rotation of said actuating member relative to said carrier member.

References Cited in the file of this patent

FOREIGN PATENTS

| | | |
|---|---|---|
| 184,058 | Austria | Dec. 10, 1955 |
| 1,126,831 | France | July 30, 1956 |
| 769,070 | Great Britain | Feb. 27, 1957 |